(12) United States Patent
Nagao et al.

(10) Patent No.: US 8,065,458 B2
(45) Date of Patent: Nov. 22, 2011

(54) ARBITRATION APPARATUS, METHOD, AND COMPUTER READABLE MEDIUM WITH DYNAMICALLY ADJUSTABLE PRIORITY SCHEME

(75) Inventors: Yoshito Nagao, Tokyo (JP); Takeshi Shimoyama, Tokyo (JP)

(73) Assignee: Sony Corporation, Tokyo (JP)

( * ) Notice: Subject to any disclaimer, the term of this patent is extended or adjusted under 35 U.S.C. 154(b) by 243 days.

(21) Appl. No.: 11/736,323

(22) Filed: Apr. 17, 2007

(65) Prior Publication Data

US 2007/0294446 A1    Dec. 20, 2007

(30) Foreign Application Priority Data

Jun. 15, 2006    (JP) .................................. 2006-165904

(51) Int. Cl.
G06F 3/00 (2006.01)
G06F 5/00 (2006.01)
G06F 12/00 (2006.01)
G06F 13/14 (2006.01)
G06F 13/38 (2006.01)

(52) U.S. Cl. ........................... 710/244; 710/41; 710/241
(58) Field of Classification Search .................. 710/241, 710/244, 41
See application file for complete search history.

(56) References Cited

U.S. PATENT DOCUMENTS

| | | | | |
|---|---|---|---|---|
| 3,967,249 A | * | 6/1976 | Taniyama et al. ................ | 710/37 |
| 4,536,839 A | * | 8/1985 | Shah et al. ..................... | 711/151 |
| 4,623,846 A | * | 11/1986 | LaMacchia ................... | 327/114 |
| 4,829,467 A | * | 5/1989 | Ogata ........................... | 710/244 |
| 5,265,223 A | * | 11/1993 | Brockmann et al. .......... | 710/123 |
| 5,398,243 A | * | 3/1995 | Aguilhon et al. ............. | 370/438 |
| 5,524,235 A | * | 6/1996 | Larson et al. .................. | 711/151 |
| 5,572,215 A | * | 11/1996 | Evans et al. ................... | 342/195 |
| 5,793,747 A | * | 8/1998 | Kline ............................ | 370/230 |
| 5,809,278 A | * | 9/1998 | Watanabe et al. ............. | 711/150 |
| 5,862,355 A | * | 1/1999 | Logsdon ....................... | 710/116 |
| 5,991,265 A | * | 11/1999 | Lincoln ....................... | 370/236.1 |
| 6,006,303 A | * | 12/1999 | Barnaby et al. ............... | 710/244 |
| 6,105,102 A | * | 8/2000 | Williams et al. .............. | 710/261 |
| 6,128,676 A | * | 10/2000 | Ohkubo ......................... | 710/28 |
| 6,199,127 B1 | * | 3/2001 | Ajanovic ...................... | 710/100 |
| 6,240,475 B1 | * | 5/2001 | Anubolu ....................... | 710/107 |

(Continued)

FOREIGN PATENT DOCUMENTS

JP        05189366 A    *    7/1993

(Continued)

OTHER PUBLICATIONS

Reed, J.; Manjikian, N.; , "A dual round-robin arbiter for split-transaction buses in system-on-chip implementations," Electrical and Computer Engineering, 2004. Canadian Conference on , vol. 2, No., pp. 835-840 vol. 2, May 2-5, 2004.*

(Continued)

Primary Examiner — Faisal M Zaman
(74) Attorney, Agent, or Firm — Oblon, Spivak, McClelland, Maier & Neustadt, L.L.P.

(57) ABSTRACT

An information processing apparatus configured to control communications of a plurality of devices via a common communication channel on the basis of predetermined priority levels of the devices includes a changing unit configured to change the priority level of a predetermined device, which is one of the plurality of devices, having a first priority level to a second priority level for a predetermined amount of time and a controlling unit configured to control the length of the predetermined amount of time.

8 Claims, 11 Drawing Sheets

U.S. PATENT DOCUMENTS

| | | | |
|---|---|---|---|
| 6,272,580 B1 * | 8/2001 | Stevens et al. | 710/116 |
| 6,473,086 B1 * | 10/2002 | Morein et al. | 345/505 |
| 6,496,515 B2 * | 12/2002 | Lefebvre et al. | 370/455 |
| 6,542,921 B1 * | 4/2003 | Sager | 718/108 |
| 6,745,262 B1 * | 6/2004 | Benhase et al. | 710/40 |
| 6,880,028 B2 * | 4/2005 | Kurth | 710/240 |
| 7,093,045 B2 * | 8/2006 | Yamamoto | 710/116 |
| 7,099,346 B1 * | 8/2006 | Kanterakis | 370/431 |
| 7,099,975 B2 * | 8/2006 | Brown et al. | 710/240 |
| 7,174,180 B2 * | 2/2007 | Andrews et al. | 455/512 |
| 7,213,084 B2 * | 5/2007 | Ogilvie et | 710/22 |
| 7,831,265 B1 * | 11/2010 | Shen et al. | 455/464 |
| 7,904,626 B2 * | 3/2011 | Hirotsu et al. | 710/244 |
| 2002/0083063 A1 * | 6/2002 | Egolf | 707/100 |
| 2004/0232769 A1 * | 11/2004 | Pickering | 307/10.1 |
| 2005/0231529 A1 * | 10/2005 | Skwarek et al. | 345/619 |
| 2007/0294446 A1 * | 12/2007 | Nagao et al. | 710/110 |
| 2008/0168447 A1 * | 7/2008 | Lewis | 718/102 |
| 2008/0320224 A1 * | 12/2008 | Kiyota | 711/122 |
| 2009/0064153 A1 * | 3/2009 | Ishimura et al. | 718/103 |

FOREIGN PATENT DOCUMENTS

| | | | |
|---|---|---|---|
| JP | 06309180 A * | 11/1994 | |
| JP | 06309200 A * | 11/1994 | |
| JP | 07146841 A * | 6/1995 | |
| JP | 7-319806 | 12/1995 | |
| JP | 8-83254 | 3/1996 | |
| JP | 09114774 A * | 5/1997 | |
| JP | 9-297731 | 11/1997 | |
| JP | 11219585 A * | 8/1999 | |
| JP | 11327921 A * | 11/1999 | |
| JP | 2002-222161 A | 8/2002 | |
| JP | 2003-186824 | 7/2003 | |
| JP | 2006-18661 | 1/2006 | |
| JP | 2006-39672 | 2/2006 | |

OTHER PUBLICATIONS

Cena, G.; Valenzano, A.; , "A multistage hierarchical distributed arbitration technique for priority-based real-time communication systems," Industrial Electronics, IEEE Transactions on , vol. 49, No. 6, pp. 1227-1239, Dec. 2002.*

Lisner, J.Chr.; , "Scheduling in a time-triggered protocol with dynamic arbitration," Industrial Electronics, 2005. ISIE 2005. Proceedings of the IEEE International Symposium on , vol. 4, No., pp. 1399-1404, Jun. 20-23, 2005.*

Kun-Da Wu; Wanjiun Liao; , "On service differentiation for multimedia traffic in multi-hop wireless networks," Wireless Communications, IEEE Transactions on , vol. 8, No. 5, pp. 2464-2472, May 2009.*

Office Action issued May 19, 2011, in Japanese Patent Application No. 2006-165904, filed Jun. 15, 2006.

Office Action issued Aug. 30, 2011, in Japanese Patent Application No. 2006-165904.

* cited by examiner

ARBITRATION APPARATUS, METHOD, AND COMPUTER READABLE MEDIUM WITH DYNAMICALLY ADJUSTABLE PRIORITY SCHEME

CROSS REFERENCES TO RELATED APPLICATIONS

The present invention contains subject matter related to Japanese Patent Application JP 2006-165904 filed in the Japanese Patent Office on Jun. 15, 2006, the entire contents of which are incorporated herein by reference.

BACKGROUND OF THE INVENTION

1. Field of the Invention

The present invention relates to an information processing apparatus, a method of processing information, and a program for processing information and, more specifically, relates to an information processing apparatus, a method of processing information, and a program for processing information that are capable of controlling communication among a plurality of devices via a common communication channel in accordance with priority levels.

2. Description of the Related Art

As methods of bus arbitration, there are known methods of arbitrating access in a fair manner based on a round-robin method or arbitrating the order of access based on a fixed-priority method.

According to the round-robin method, a plurality of masters occupies the buses in sequence, regardless of the processing state. Therefore, unnecessary waiting time is generated, and access of the masters becomes inefficient.

According to the fixed-priority method, if the priority level of a master frequently sending access requests is set high, access requests from other masters having lower priority levels will not be accepted, and the system operation will fail.

FIG. 1 is a block diagram illustrating the structure of a known apparatus employing the fixed-priority method. The apparatus shown in FIG. 1 includes a master A 31, a master B 32, a masters C 33, and a masters D 34 that are connected to a bus arbitrating mechanism (hereinafter referred to as an "arbitrator") 35.

Among the masters A 31, B 32, C 33, and D 34, the master A 31 has the highest priority level, the master B 32 has the second highest priority level, the masters C 33 has the third highest priority level, and the masters D 34 has the fourth highest priority level.

When the arbitrator 35 receives an access request from the master A 31, B 32, C 33, or D 34, the arbitrator 35 responds to the access request from the master having the highest priority level among all the masters sending access requests and permits access of this master. Either the master A 31, B 32, C 33, or D 34 is permitted access after receiving a response from the arbitrator 35.

For example, when the masters A 31, B 32, C 33, and D 34 simultaneously send access requests, the masters are arbitrated on the basis of their priority levels. Therefore, the request from the master A 31 having the highest priority level is received with priority. In this case, the arbitrator 35 responds to the master A 31, and then the master A 31 is permitted accesses.

Hereinafter, the priority levels are referred to as priority level 1, priority level 2, priority level 3, priority level 4, and priority level 5, where priority level 1 is the highest priority level and priority level 5 is the lowest priority level.

FIG. 2 is a timing chart of a known case in which access requests from and responses to the masters A 31, B 32, C 33, and D 34 when the delay time from sending a request to receiving a response is equal to 1 clock pulse.

The timing chart in FIG. 2 illustrates, from top to bottom, a clock pulse, a request from the master A 31, a request from the master B 32, a request from the master C 33, a request from the master D 34, a response to the master A 31, a response to the master B 32, a response to the master C 33, and a response to the master D 34. Timings T1 to T23 each represent the rising time of clock pulses.

As shown in FIG. 2, when, at the timing T3, access requests are simultaneously sent from the master A 31 and the master B 32, the arbitrator 35 responds to the master A 31, having higher priority, and does not respond to the master B 32. Thus, at the timing T3, the master A 31 is permitted access but the master B 32 is not.

Similarly, when, at the timing T5, access requests are simultaneously sent from the master B 32 and the master C 33, the arbitrator 35 responds to the master B 32, having higher priority, and does not respond to the master C 33. Thus, at the timing T5, the master B 32 is permitted access but the master C 33 is not.

When, at the timing T7, an access request is sent only from the master C 33, the arbitrator 35 responds to the master C 33. Thus, at the timing T7, the master C 33 is permitted accesses. When, at the timing T9, an access request is sent only from the master D 34, the arbitrator 35 responds to the master D 34, and the master D 34 having the lowest priority level is permitted access.

Since, between timings T12 and 16, access requests are simultaneously sent from the masters A 31, B 32, C 33, and D 34, the master A 31 having the highest priority level is permitted exclusive accesses. With the priority levels fixed, if a access request from the master A 31 extends for a long period of time, as shown in FIG. 2, access requests from the masters B 32, C 33, and D 34 whose priority levels are lower than that of the master A 31 are completely rejected. Therefore, the priority levels of the masters must be determined carefully based on the order of priority of processing.

Accordingly, a mechanism for changing the access order is commonly provided. For example, a method that allows fine control of the priority levels by controlling the time intervals of access requests on the master side using a simply bus arbitration mechanism is known (for example, refer to Japanese Unexamined Patent Application Publication No. 2003-186824).

SUMMARY OF THE INVENTION

Since the size of the circuit increases due to the complexity of the access request mechanism of the masters, the intervals between the access requests become long, i.e., periods of time in which the devices are not used is generated. Therefore, when an interval is momentarily generated between accesses, the operation cannot respond to this, and the usage rate of the bus cannot be improved. In particular, for mobile devices, to reduce electric consumption, the clock frequency is not increased and the speed of the memory is reduced. Therefore, the amount of time the access of masters is not allowed must be reduced and the efficiency of the access of the master must be increased.

The present invention has been conceived in light of the problems described above. Thus, according to embodiments of the present invention, when a plurality of masters access a device on the basis of their priority levels, the masters are capable of accessing a device within a predetermined amount of time and the amount of time in which none of the masters can access a devices is reduced.

An information processing apparatus according to an embodiment of the present invention is configured to control communications of a plurality of devices via a common communication channel on the basis of predetermined priority levels of the devices and includes changing means for changing the priority level of a predetermined device having a first priority level to a second priority level for a predetermined amount of time, the predetermined device being one of the plurality of devices, and controlling means for controlling the length of the predetermined amount of time.

The changing means can return the second priority level of the predetermined device to the first priority level after the predetermined amount of time elapses.

The changing means can change the priority level of the predetermined device having the first priority level to the second priority level when responding to a communication request from the predetermined device.

The controlling means may control the length of the predetermined amount of time by counting up at each clock pulse and operating a counter so as to reset the counted value when the counted value reaches a predetermined threshold value, and the changing means may return the priority level of the predetermined device having the second priority level to the first priority level when the counted value reaches the threshold value.

The controlling means may control the operation of the counter when a communication request is sent from the predetermined device and when the priority level of the predetermined device is changed to the second priority level.

The communication channel may be constituted of a bus.

The plurality of devices may transmit and receive image data between each other via the communication channel, the image data configured of frames or fields; the changing means may change the priority level of the predetermined device during the predetermined amount of time so that image processing of at least a frame or a field within a predetermined amount of frame time assigned to a frame or a predetermined amount of field time assigned to a field; and the controlling means may control the length of the predetermined amount of time so as to maintain the length of the frame time or the field time.

A method of processing information, according to an embodiment of the present invention, for controlling communications of a plurality of devices via a common communication channel on the basis of predetermined priority levels of the devices, the method comprising the steps of changing the priority level of a predetermined device having a first priority level to a second priority level for a predetermined amount of time, the predetermined device being one of the plurality of devices, and controlling the length of the predetermined amount of time.

A computer program, according to an embodiment of the present invention, for controlling communications of a plurality of devices via a common communication channel on the basis of predetermined priority levels of the devices, the program comprising the steps of changing the priority level of a predetermined device having a first priority level to a second priority level for a predetermined amount of time, the predetermined device being one of the plurality of devices, and controlling the length of the predetermined amount of time.

According to another embodiment of the present invention, the priority level of a predetermined device having a first priority level is changed to a second priority level for a predetermined amount of time, the predetermined device being one of the plurality of devices.

As described above, according to an embodiment of the present invention, a plurality of masters can access a device in accordance with priority levels. According to an embodiment of the present invention, when a plurality of masters access a device in accordance with priority levels, the masters can reliably access the device within a predetermined amount of time, and the amount of time none of the masters can access the device is reduced.

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

An information processing apparatus according to an embodiment of the present invention is configured to control communications of a plurality of devices via a common communication channel on the basis of predetermined priority levels of the devices and includes changing means (for example, a changing unit 171 shown in FIG. 4) for changing the priority level of a predetermined device having a first priority level to a second priority level for a predetermined amount of time, the predetermined device being one of the plurality of devices, and controlling means (for example, a counter control unit 154 shown in FIG. 4) for controlling the length of the predetermined amount of time.

Figure 7:
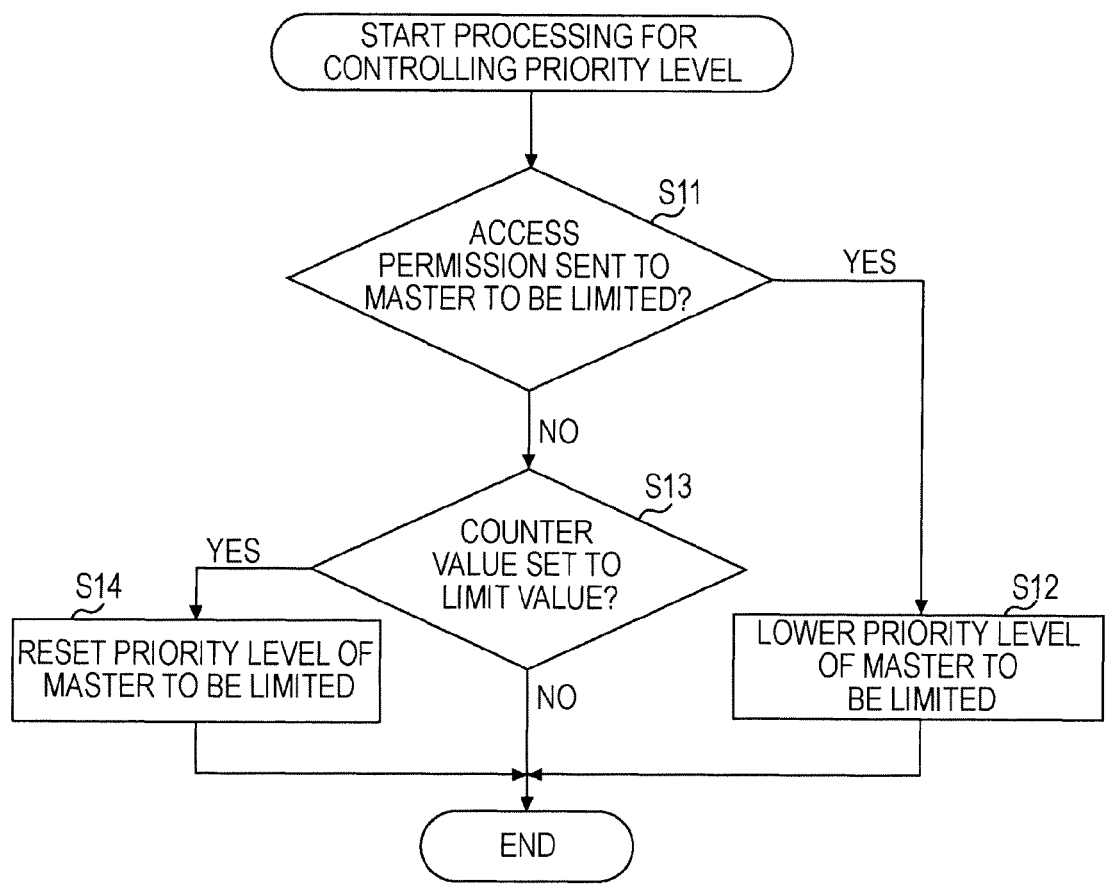
FIG. 7 is a flow chart illustrating a process of controlling priority levels.

The changing means can return the second priority level of the predetermined device to the first priority level after the predetermined amount of time elapses (for example, Step S14 shown in FIG. 7).

The changing means can change the priority level of the predetermined device having the first priority level to the second priority level when responding to a communication request from the predetermined device (for example, Step S12 shown in FIG. 7).

The controlling means may control the length of the predetermined amount of time by counting up at each clock pulse and operating a counter so as to reset the counted value when the counted value reaches a predetermined threshold value (for example, Steps S31 to S33 shown in FIG. 8), and the changing means may return the priority level of the predetermined device having the second priority level to the first priority level when the counted value reaches the threshold value (for example, Step S14 shown in FIG. 7).

Figure 10:
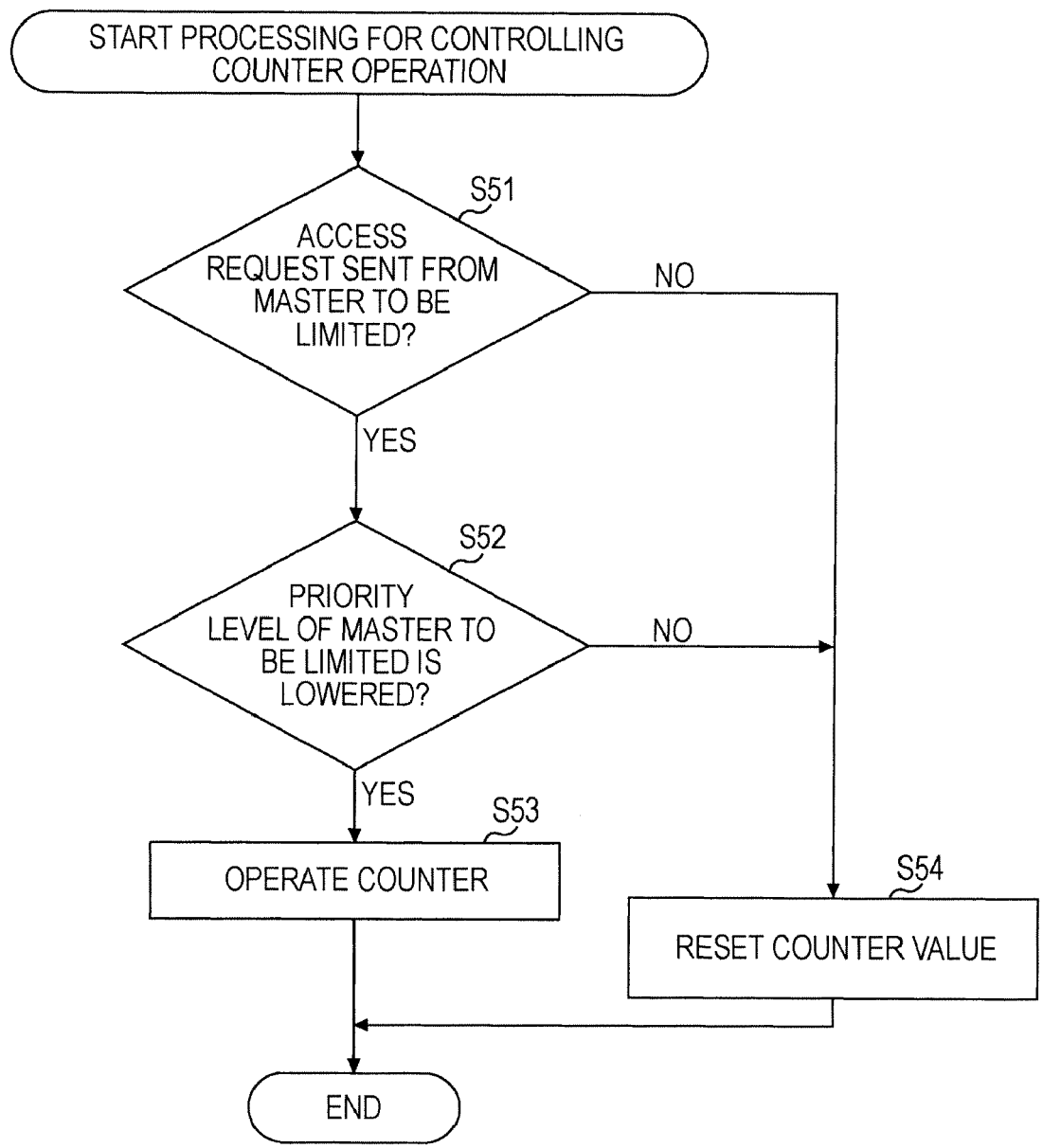
FIG. 10 is a flow chart illustrating another process of controlling the operation of the counter.

The controlling means may control the operation of the counter when a communication request is sent from the predetermined device and when the priority level of the predetermined device is changed to the second priority level (for example, Steps S51 to S53 shown in FIG. 10).

Figure 1:
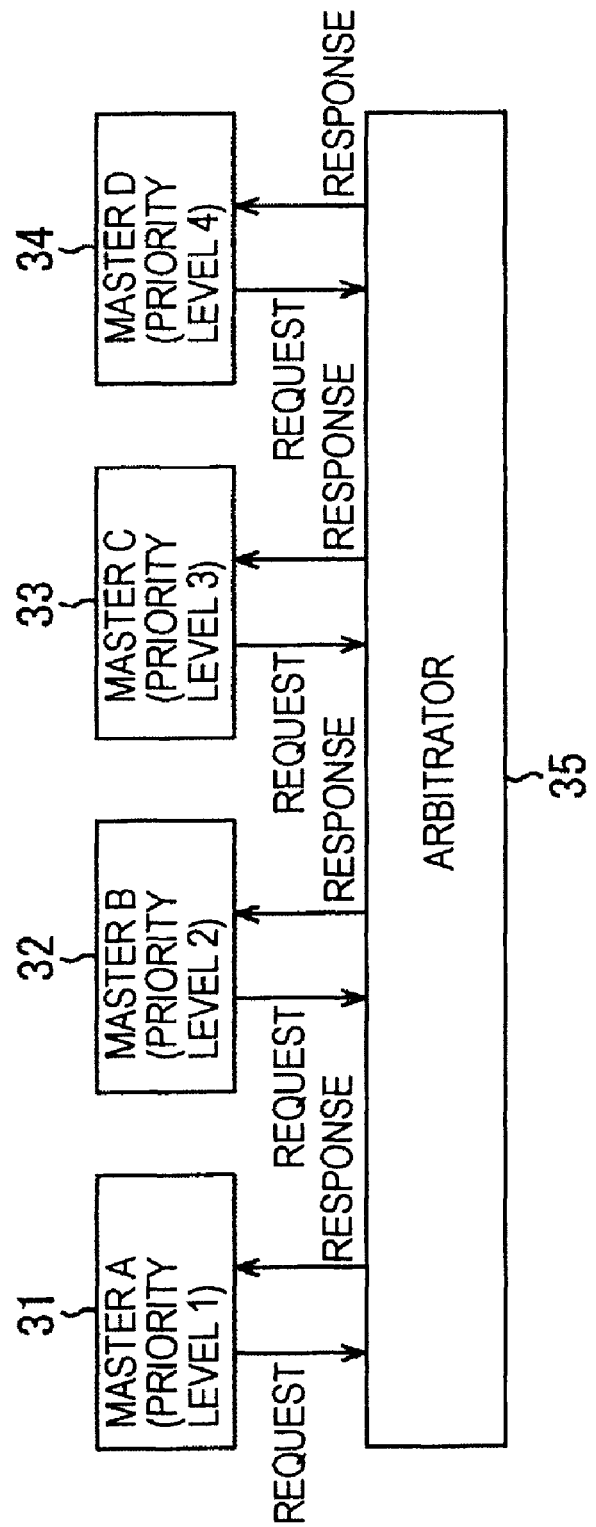
FIG. 1 is a block diagram illustrating the structure of an apparatus employing a known fixed priority method.
Figure 2:
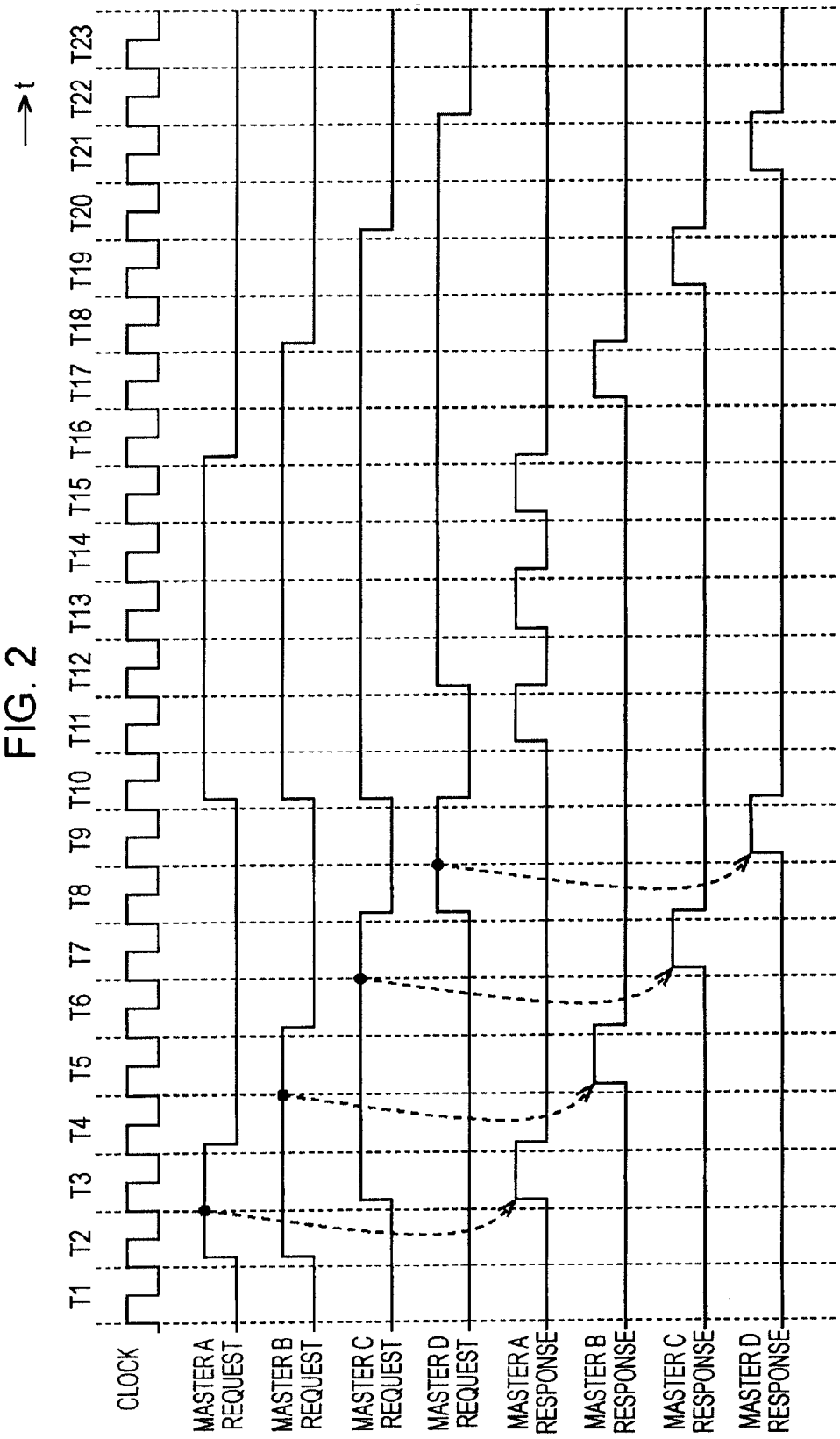
FIG. 2 is a timing chart illustrating access requests and responses of known masters.
Figure 3:
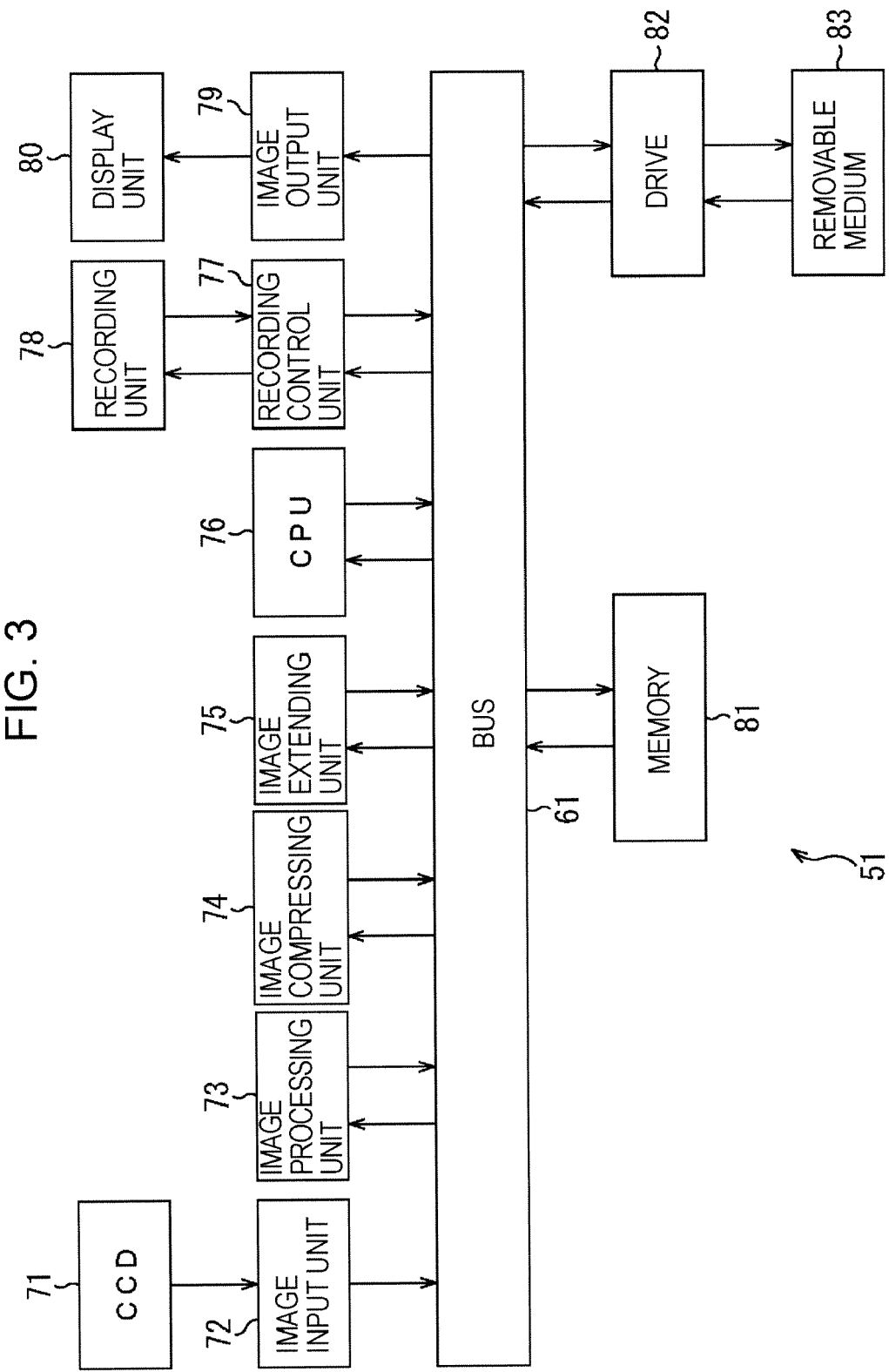
FIG. 3 is block diagram illustrating the structure of a digital video camera according to an embodiment of the present invention.

The communication channel may be constituted of a bus (for example, a bus 61 shown in FIG. 3).

The plurality of devices (for example, an image input unit 72 shown in FIG. 3) may transmit and receive image data between each other via the communication channel, the image data being configured of frames or fields; the changing means may change the priority level of the predetermined device during the predetermined amount of time so that image processing of at least a frame or a field within a predetermined amount of frame time assigned to a frame or a predetermined amount of field time assigned to a field; and the controlling means may control the length of the predetermined amount of time so as to maintain the length of the frame time or the field time.

Figure 8:
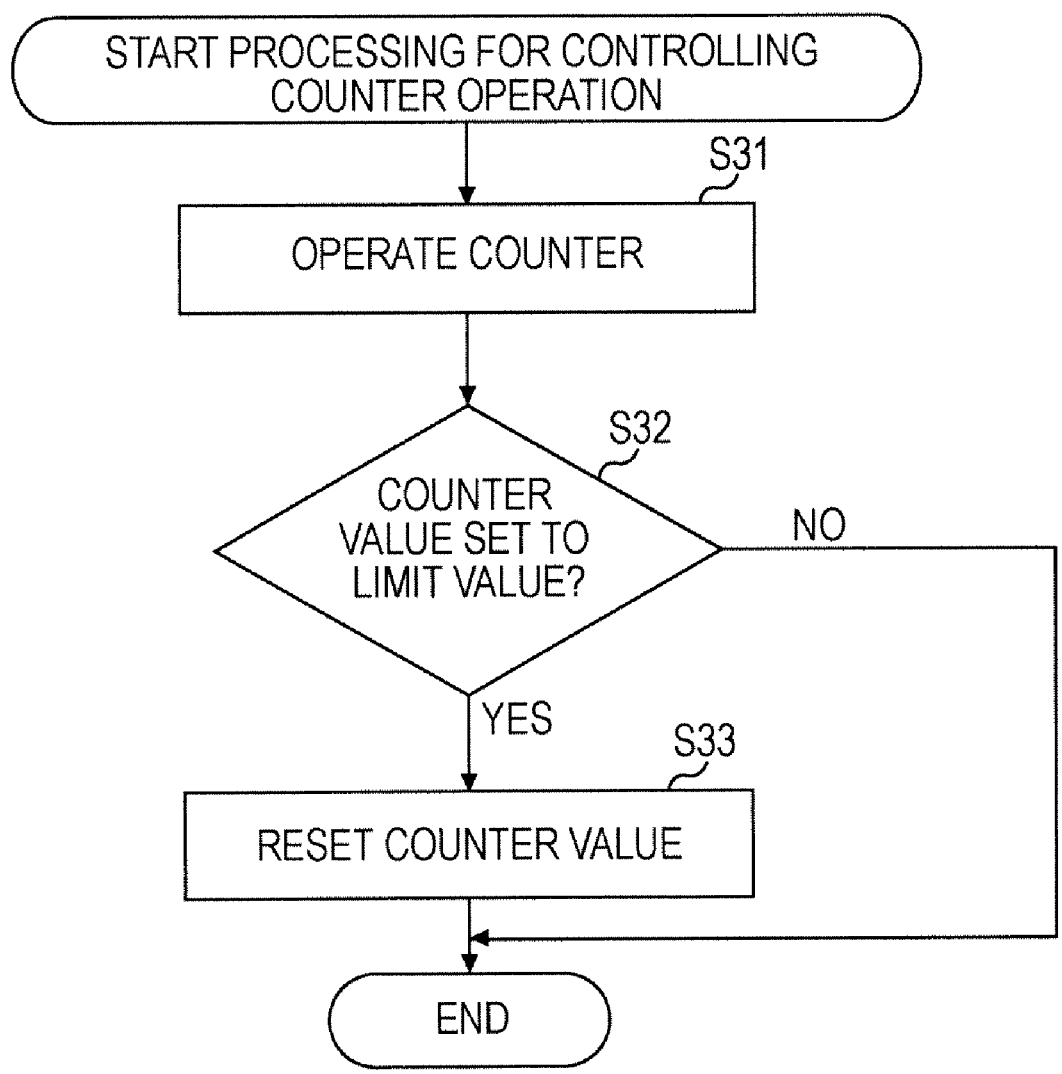
FIG. 8 is a flow chart illustrating a process of controlling the operation of a counter.

A method of processing information, according to an embodiment of the present invention, for controlling communications of a plurality of devices via a common communication channel on the basis of predetermined priority levels of the devices, the method comprising the steps of changing the priority level of a predetermined device having a first priority level to a second priority level for a predetermined amount of time, the predetermined device being one of the plurality of devices (for example, Step S12 shown in FIG. 7), and controlling the length of the predetermined amount of time (for example, Steps S31 to S33 shown in FIG. 8).

A computer program, according to an embodiment of the present invention, for controlling communications of a plurality of devices via a common communication channel on the basis of predetermined priority levels of the devices, the program comprising the steps of changing the priority level of a predetermined device having a first priority level to a second priority level for a predetermined amount of time, the predetermined device being one of the plurality of devices (for example, Step S12 shown in FIG. 7), and controlling the length of the predetermined amount of time (for example, Steps S31 to S33 shown in FIG. 8).

FIG. 3 is a block diagram illustrating the structure of a digital video camera according to an embodiment of the present invention.

A digital video camera 51 shown in FIG. 3 is an example of an information processing apparatus for carrying out recording and replay of images. The digital video camera 51 has a unified memory architecture that allows one memory to be used by a plurality of devices. Below, the digital video camera 51 will be described as an example of an information processing apparatus. However, the information processing unit is not limited a digital video camera, and any other type of processing apparatus, such as digital still camera or a audio recorder, capable of processing predetermined data, such as image or audio, may be employed.

The digital video camera 51 includes a bus 61, a charged coupled device (CCD) 71, an image input unit 72, an image processing unit 73, an image compressing unit 74, an image extending unit 75, a central processing unit (CPU) 76, a recording control unit 77, a recording unit 78, an image output unit 79, a display unit 80, and a memory 81.

When required, a driver 82 is connected to the digital video camera 51. A removable medium 83, such as a magnetic disk (e.g., a flexible disk) or a magneto-optical disk (e.g., a compact disk-read only memory (CD-ROM) or a digital versatile disk (DVD)), is installed to the driver 82 so as to store data.

The image input unit 72, the image processing unit 73, the image compressing unit 74, the image extending unit 75, the third positioning reference surface 76, the recording control unit 77, the image output unit 79, the memory 81, and the driver 82 are connected to each other via the bus 61. These units 72, 73, 74, 75, 76, 77, and 79 are examples of masters.

The CCD 71 is constituted of a CCD sensor and is configured to convert light into an analog electric signal by photoelectrically converting an image formed of light by a lens (not shown). The CCD 71 sends an image signal, which is an analog electric signal obtained by photoelectric conversion, to the image input unit 72.

The CCD 71 is not limited thereto, and, instead an image pickup element configured to generate image signals in pixel units, such as a complementary metal oxide semiconductor (CMOS) sensor, may be provided.

The image input unit 72 converts the analog image signal sent from the CCD 71 into digital image data. The image input unit 72 writes the image data obtained by this conversion in the memory 81 via the bus 61.

The image processing unit 73 reads out the image data in the memory 81 by the image input unit 72 and carries out various types of image processing, if required. For example, the image processing unit 73 carries out noise reduction (NR) to the image data so as to reduce noise generated during photoelectric conversion by the CCD 71 or during transmission of the image signal (i.e., analog signal) by the image input unit 72 or applies various effects to the image data. The image processing unit 73 writes the processed image data in the memory 81 via the bus 61.

The image compressing unit 74 reads out the image data written in the memory 81 by the image processing unit 73 and encodes the image data using a predetermined code. For example, the image compressing unit 74 encodes the image data using Moving Picture Experts Group (MPEG) 2. The image compressing unit 74 writes the coded image data in the memory 81 via the bus 61.

The image extending unit 75 decodes the image data recorded in the recording unit 78 according to the code used to encode the image data. The image extending unit 75 writes the decoded image data in the memory 81 via the bus 61.

The CPU 76 carries out various types of processing according to programs stored in the memory 81. Data required for executing the various types of processing is stored in the memory 81. The CPU 76 controls the overall operation of the digital video camera 51.

During recording, the recording control unit 77 reads out coded data written in the memory 81 by the image compressing unit 74 and records the read out data in the recording unit 78. During replay, the recording control unit 77 reads out the coded image data stored in the recording unit 78 and writes the read out data in the memory 81 via the bus 61.

The recording unit 78 is constituted of, for example, a hard disk drive, an optical disk, such as a digital versatile disk (DVD) driven by a predetermined drive, the drive, or a semiconductor memory, such as a memory card.

The image output unit 79 reads out the image data written in the memory 81 by the image processing unit 73 via the bus 61, generates display data for displaying an image, and supplies the display data to the display unit 80.

The display unit 80 is constituted of, for example, a display device, such as a liquid crystal display (LCD) or an organic electro luminescence (EL) and displays various images corresponding to the display data sent from the image output unit 79.

The memory 81 is constituted of, for example, a semiconductor memory, such as a synchronous dynamic random access memory (SDRAM).

With the above-described structure, the digital video camera 51 is capable of recording or replaying an image of an object.

With an audio visual (AV) apparatus, such as the digital video camera 51, that records or replays image and audio, processing that has to be carried out in real time processing and processing to be carried out at best-effort, such as processing carried out by the CPU 76, are both carried out. In general, processing that has to be carried out in real time has a high priority level, whereas processing that does no have to be carried out in real time has a low priority level. Since an input/output system of video signals transmits and receives signals according to a predetermined standard (for example, Comite Consultatif Internationale de Radio-communications (CCIR)-656), processing is required to be carried out in real time in accordance with clock pulses. When video signal processing is carried out via the memory 81, such as an SDRAM, processing does not have to be carried out in real time by clock pulses. However, the processing has to be carried out in real time by frames or fields, and a minimum frame rate or field rate has to be maintained. When processing requiring a minimum frame rate or field rate to be maintained and processing to be carried out at best-effort, such as processing carried out by the CPU 76, are both to be carried out, the access time of the CPU 76 is limited by the level of the image processing. However, when a frame rate or a field rate is to be maintained, image processing does not have to constantly given high priority so long as access is permitted for an amount of time sufficient for completing the processing within the frame time or the field time.

In this way, when processing that has to be carried out in real time and processing to be carried out at best-effort are both to be carried out, an arbitrator (not shown in FIG. 3) limits access and periodically permits access of masters having low priority levels so as to improve the usage rate of the bus 61. The arbitrator may be provided independently and be connected to the bus 61 or may be provided as a single unit with the memory 81 or the CPU 76.

In the following drawings, the bus 61 is not shown.

Figure 4:
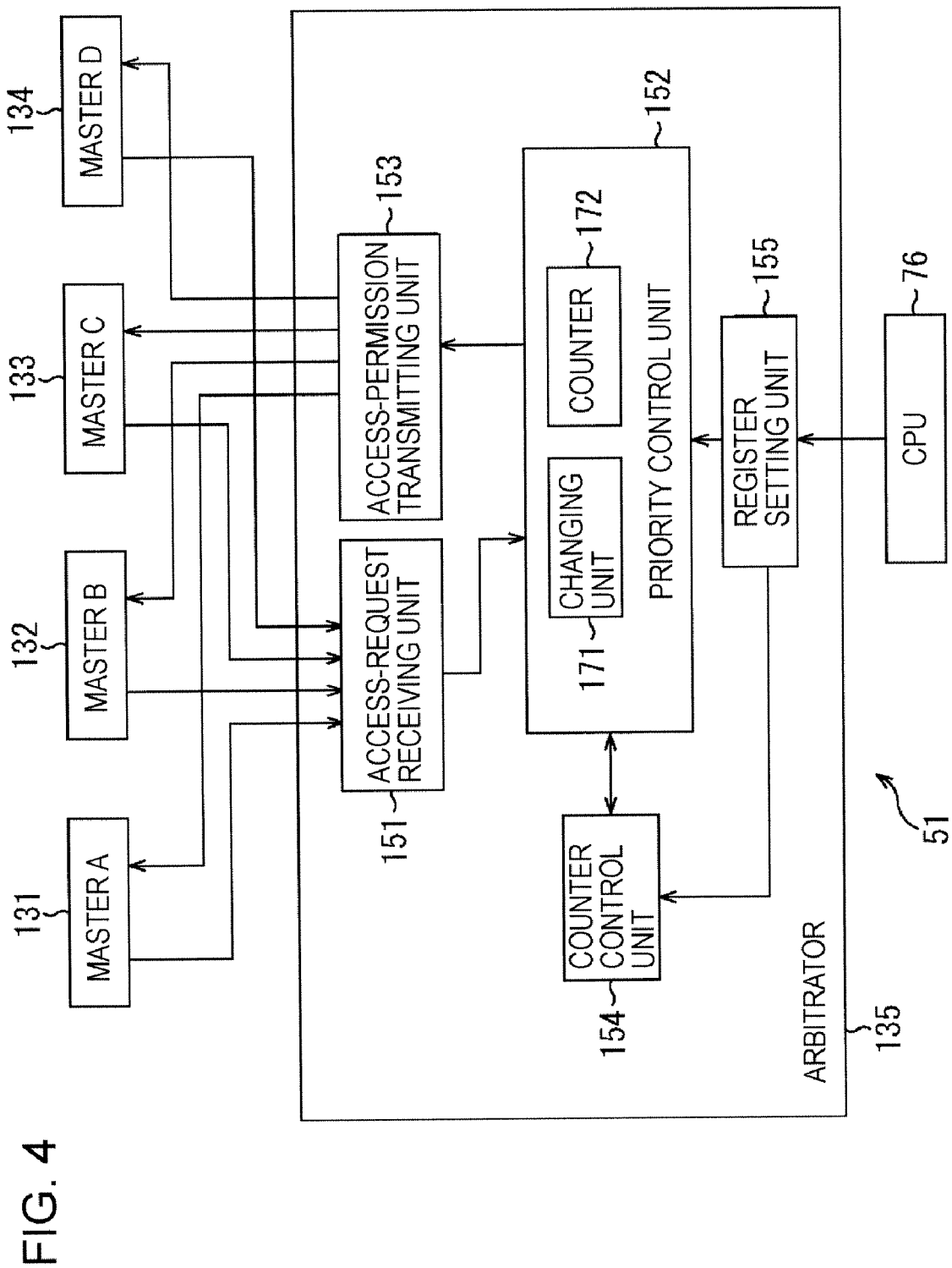
FIG. 4 is block diagram illustrating the functional structure of the digital video camera including masters and a arbitrator.

FIG. 4 is a block diagram illustrating the functional structure of the digital video camera 51 including masters and an arbitrator. As shown in FIG. 4, the digital video camera 51 includes a master A 131, a master B 132, a master C 133, a master D 134, an arbitrator 135, and the CPU 76.

The masters A 131, B 132, C 133, and D 134 are examples of devices and each master is one of the following units: the image input unit 72, the image processing unit 73, the image compressing unit 74, the image extending unit 75, the CPU 76, the recording control unit 77, and the image output unit 79. For example, the master A 131 is the image input unit 72; the master B 132 is the image processing unit 73; the master C 133 is the image compressing unit 74; and the master D 134 is the recording control unit 77.

As shown in FIG. 4, the masters A 131, B 132, C 133, and D 134 are connected to the arbitrator 135 and send access requests to the arbitrator 135. The arbitrator 135 carries out access arbitration for the masters A 131, B 132, C 133, and D 134 via the bus 61 (not shown) on the basis of predetermined priority levels of the masters A 131, B 132, C 133, and D 134.

The arbitrator 135 includes an access-request receiving unit 151, a priority control unit 152, an access-permission transmitting unit 153, a counter control unit 154, and a register setting unit 155.

The access-request receiving unit 151 receives access requests from the masters A 131, B 132, C 133, and D 134, which are connected to the arbitrator 135. The access-request receiving unit 151 notifies the reception of an access request to the priority control unit 152.

The priority control unit 152 determines in advance the priority levels of the masters A 131, B 132, C 133, and D 134 and controls the priority levels so as to changes the priority levels of predetermined masters.

Upon reception of a notification of an access request from the access-request receiving unit 151, the priority control unit 152 selects the master having the highest priority level among the masters A 131, B 132, C 133, and D 134. Then, the priority control unit 152 notifies the access-permission transmitting unit 153 about which one of the masters A 131, B 132, C 133, and D 134 has been selected. In other words, priority control unit 152 determines which one of the masters A 131, B 132, C 133, and D 134 is to be permitted access on the basis of the of priority levels of the masters A 131, B 132, C 133, and D 134.

The priority control unit 152 includes a changing unit 171 and a counter 172.

The changing unit 171 changes priority level of the master having a first priority level among the masters A 131, B 132, C 133, and D 134 to a second priority levels for a predetermined period of time. After the predetermined period of time elapses, the changing unit 171 changes back the second priority level to the first priority level.

Hereinafter, the master whose priority level is changed is referred to as a "limited master."

Figure 5:
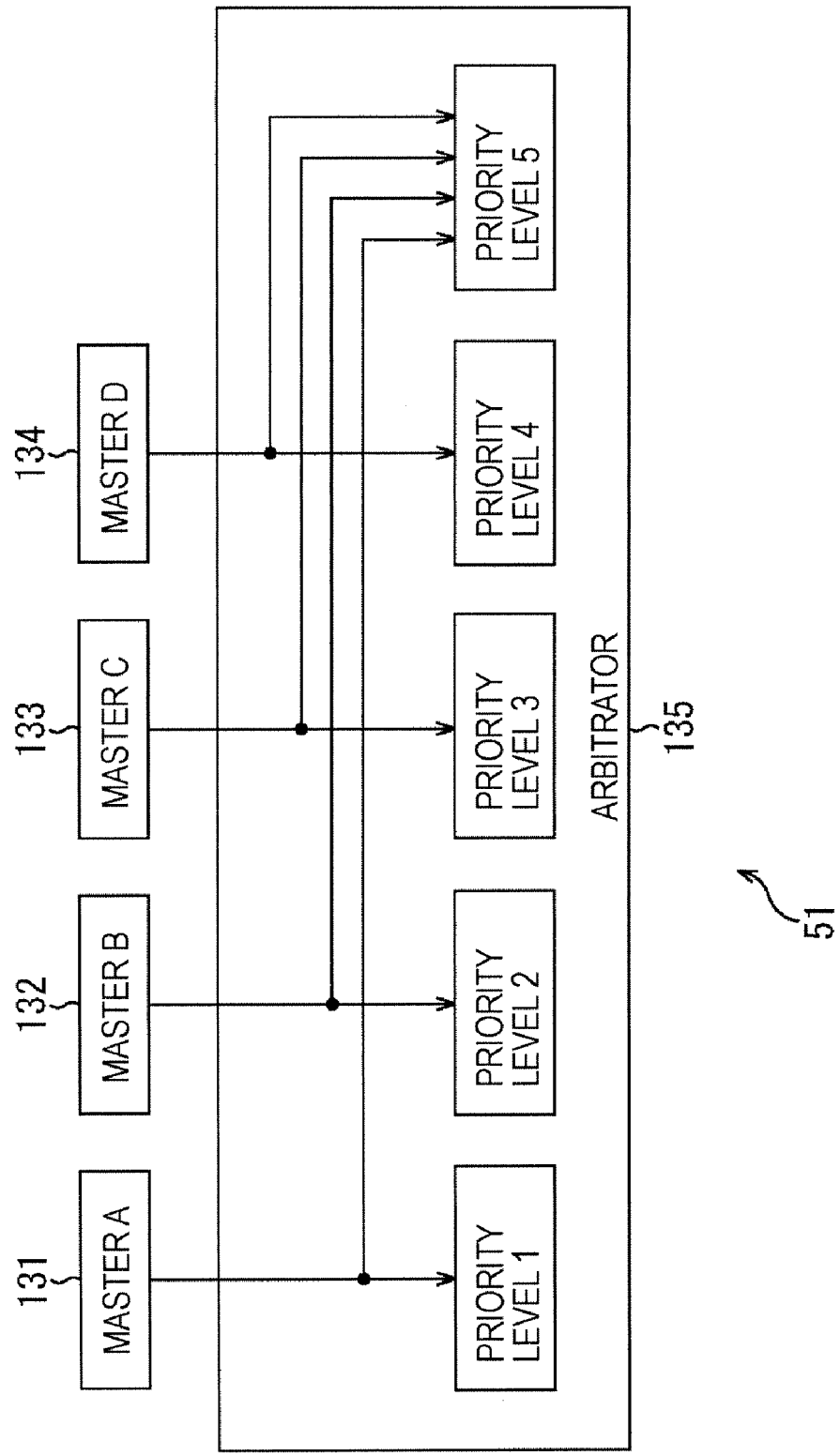
FIG. 5 illustrates the function of the arbitrator.

More specifically, as shown in FIG. 5, for example, the changing unit 171 selects one of the masters connected to the arbitrator 135, i.e., the master A 131 of priority level 1, the master B 132 of priority level 2, the master C 133 of priority level 3, or the master D 134 of priority level 4, as a limited master, changes the priority level of the selected limited master in the arbitrator 135 to priority level 5, which is the lowest priority level, for a predetermined amount of time, and then, changes back the priority level to the original priority level after the predetermined amount of time elapses.

The changing unit 171, for example, changes the priority level of the limited master having the first priority level to the second priority level when the responding to the access request from the limited master. In other words, the changing unit 171 changes the priority level that of a predetermined device having the first priority level to the second priority level when responding to the access request from this predetermined device.

The counter 172 counts clock pulses used as references by the arbitrator 135 for the control and sends a counter value to the changing unit 171. The changing unit 171 changes the priority level of the predetermined device when the counter value of the counter 172 reaches a predetermined limit value.

The access-permission transmitting unit 153 sends a response of permitting access to one of the masters A 131, B 132, C 133, and D 134 whose access has been permitted by the priority control unit 152.

The counter control unit 154 controls length of the period of time the priority level of the limited master is being changed. More specifically, the linear light sources 154 controls the length of the period of time the priority level of the limited master is being changed by controlling the operation of the counter 172.

Under the control of the CPU 76, the register setting unit 155 sets the value for assigning the limited master whose priority level is to be changed and sets a limit value of the counter value of the counter 172.

Another CPU, in addition to the CPU 76, may be provided. This additional CPU may set the value for assigning the limited master whose priority level is to be changed and sets the limit value of the counter value of the counter 172 for the register setting unit 155.

Next, a case will be described with reference to the timing chart shown in FIG. 6. In this case, the delay time from a request to a response equals one clock pulse, the master A 131 is selected as the limited master, among the masters A 131, B 132, C 133, and D 134, and the priority level of the master A 131 (limited master) is set to priority level 5 for a predetermined period of time.

Figure 6:
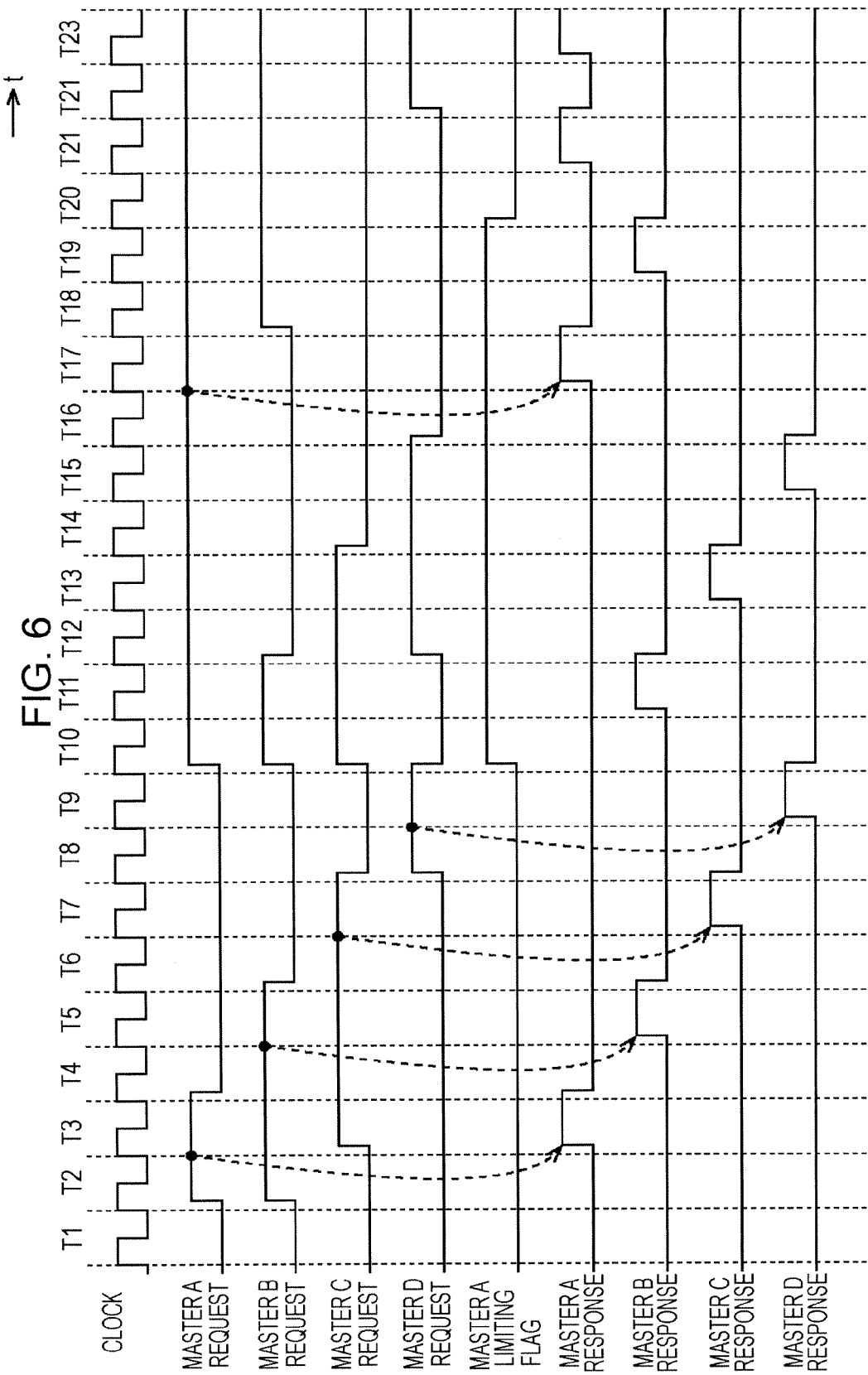
FIG. 6 is a timing chart illustrating the accessing of the masters.

The timing chart in FIG. 6 illustrates, from top to bottom, a request from the master A 131, a request from the master B 132, a request from the master C 133, a request from the master D 134, a master A limiting flag, a response to the master A 131, a response to the master B 132, a response to the master C 133, and a response to the master D 134. Timings T1 to T23 represent the rising time of clock pulses.

While the master A limiting flag is not set, the priority level of the master A 131 is set to priority level 1, whereas while the master A limiting flag is set, the priority level of the master A 131 is set to priority level 5.

When, at the timing T3, access requests are simultaneously sent from the master A 131 and the master B 132, the arbitrator 135 responds to the master A 131 of priority level 1 having a priority level higher than that of the master B 132 of priority level 2 and does not respond to the master B 132. In other words, the arbitrator 135 permits access of the master A 131. Therefore, at the timing T3, the master A 131 accesses a device, but the master B 132 does not access a device. For example, the master A 131 accesses, via the bus 61, either the master B 132, C 133, or D 134, or the memory 81.

When, at the timing T5, access requests are sent from the master B 132 and the master C 133, the arbitrator 135 responds to the master B 132 of priority level 2 having a priority level higher than that of the master C 133 of priority level 3 and does not respond to the master C 133. In other words, the arbitrator 135 permits access of the master B 132. Therefore, at the timing T5, the master B 132 access a device, but the master C 133 does not access a device. For example, the master B 132 accesses, via the bus 61, either the master A 131, C 133, or D 134, or the memory 81.

When, at the timing T7, an access request is sent only from the master C 133, the arbitrator 135 responds to the master C 133. In other words, the master C 133 permits access of the master C 133. Therefore, at the timing T7, the master C 133 accesses a device. For example, the master C 133 accesses, via the bus 61, either the master A 131, B 132, or D 134, or the memory 81.

At the timing T9, an access request is sent only from the master D 134. Thus, the arbitrator 135 responds to the master D 134. At the timing T9, the master D 134 of priority level 4 having the lowest priority level accesses a device. For example, the master D 134 accesses, via the bus 61, either the master A 131, B 132, or C 133, or the memory 81.

Between the timings T10 and T20, since a master A limiting flag that limits the access of the master A 131 is set, the priority level of the master A 131 is set to priority level 5. In other words, between the timings T10 and T20, the priority level of the master A 131 is lower than the priority levels of the masters B 132, C 133, and D 134.

For example, when, at the timing T11, access requests are simultaneously sent from the masters A 131, B 132, and C 133, the arbitrator 135 responds to the master B 132 of priority level 2 having a priority level higher than that of the master A 131 of priority level 5 and that of the master C 133 of priority level 3 and does not respond to the masters A 131 and C 133. In other words, the arbitrator 135 permits access of the master B 132. Therefore, at the timing T11, the master B 132 access a device, but the master A 131 and the master C 133 do not access a device.

Similarly, when, at the timing T13, access requests are simultaneously sent from the masters A 131, C 133, and D 134, the arbitrator 135 responds to the master C 133 of priority level 3 having a priority level higher than that of the master A 131 of priority level 5 and that of the master D 134 of priority level 3 and does not respond to the masters A 131 and D 134. In other words, the arbitrator 135 permits access of the master C 133. Therefore, at the timing T13, the master C 133 access a device, but the masters A 131 and D 134 do not access devices.

When, at the timing T15, access requests are simultaneously sent from the masters A 131 and D 134, the arbitrator 135 responds to the master D 134 of priority level 4 having a priority level higher than that the master A 131 of priority level 5, and does not respond to the master A 131. In other words, the arbitrator 135 permits access of the master D 134. Therefore, at the timing T15, the master D 134 access a device, but the master A 131 does not access a device.

At the timing T17, an access request is sent from the master A 131 but access requests are not sent from the masters B 132, C 133, and D 134. Therefore, the arbitrator 135 responds to the master A 131. Accordingly, at the timing T17, the master A 131 accesses a device.

When, at the timing T19, access requests are simultaneously sent from the masters A 131 and B 132, similar to the case for the timing T11, the arbitrator 135 responds to the master B 132, and the master B 132 accesses a device.

Since, from the timing T20, the master A limiting flag is not set, the priority level of the master A 131 is changed back to the original priority level. In other words, from the timing T20, the master A 131 is treated as a master of priority level 1 having the highest priority level.

Since, at the timing T21, access requests are simultaneously sent from the masters A 131 and B 32, the arbitrator 135 responds to the master A 131 of priority level 1 having a priority level higher than that of the master B 132 of priority level 2 and does not respond to the master B 132. In other words, the arbitrator 135 permits access of the master A 131. Therefore, at the timing T21, the master A 131 access a device, but the master B 132 does not access a device.

Since, at the timing T23, access requests are simultaneously sent from the masters A 131, B 132, and D 134, the arbitrator 135 responds to the master A 131 that has the highest priority level among the priority levels of the masters A 131, B 132, and D 134 and, at the timing T23, the master A 131 accesses a device.

In this way, by lowering the priority level of a master originally having a high priority level for a predetermined period of time, access of this master can be limited. Accordingly, access can be permitted for other masters having lower priority levels. Since the access of a limited master is not prohibited for a predetermined period of time but the priority level of the limited master is merely lowered, even when access of the limited master is limited by lowering its priority level, the limited master can access a device if there are no other masters sending access requests.

Accordingly, access of a master is not prohibited at any time. In this way, when access requests are sent from masters, one of the masters can access a device. Thus, the usage rate of the bus is improved by not creating a period of time in which the bus is not used even when a master is trying to access a device.

Next, processing for priority level control by the priority control unit 152 will be described.

FIG. 7 is a flow chart illustrating a process of controlling priority levels that is carried out at each clock pulse by the arbitrator 135.

In Step S11, the priority control unit 152 determines whether or not the access-permission transmitting unit 153 has responded to a limited master, i.e., whether or not the priority control unit 152 has sent an access permission. In Step S11, if it is determined that an access permission has been sent, the process goes to Step S12.

In Step S12, the changing unit 171 of the priority control unit 152 changes the priority level of the limited master. More specifically, for example, the changing unit 171 lowers the priority level of the limited master. Then, the process is completed.

In Step S11, when it is determined that an access permission has not been sent to the limited master, the process goes to Step S13.

In Step S13, the priority control unit 152 determines whether or not the counter value of the counter 172 that is counted up every clock pulse has reached a limit value set at the register setting unit 155. In Step S13, if it is determined that the counter value has not reached the limit value, the priority level of the limited master is not changed back to the original priority level since the period of time for lowering the priority level of the limit master has not elapsed yet. Then, the process is completed without changing the priority level of the limited master.

In Step S13, if it is determined that the counter value has reached the limit value, the process goes to Step S14 since the period of time for lowering the priority level of the limit master has elapsed.

In Step S14, the changing unit 171 of the priority control unit 152 changes back the priority level of the limited master to the original priority level. Then, the process is completed.

In this way, when access of the limited master is permitted, the priority control unit 152 changes the priority level of the limited master to a priority level with limited access that is different from the original priority level. The priority control unit 152 returns the priority level to the original priority level when the counter value reaches the limited value while access is limited.

The period of time while access of the limited master is limited, i.e., the length of time while the priority level of the limited master is changed, is controlled by controlling the operation of the counter 172 by, for example, changing the limit value to be compared with the counter value in Step S13 or by resetting the counter value of the counter 172.

Next, processing for controlling the operation of the counter 172 by the counter control unit 154 will be described.

FIG. 8 is a flow chart illustrating a process of controlling the operation of the counter 172 that is carried out at each clock pulse by the arbitrator 135.

In Step S31, the counter control unit 154 operates the counter 172. In Step S32, the counter control unit 154 determines whether or not the counter value of the counter 172 has reached a limit value set at the register setting unit 155. In Step S32, if it is determined that the counter value of the counter 172 has reached the limit value, the process goes to Step S33. In Step S33, the counter control unit 154 resets the counter value of the counter 172. Then, the process is completed. When the counter value is reset, the counter value is set to, for example, zero.

In Step S32, if it is determined that the counter value of the counter 172 has not reached the limit value, the counter value of the counter 172 is not reset. Then, the process is completed.

In this way, the counter 172 does not depend on other processes and is operated as a free-running counter in which the counted-up counter value is reset at a predetermined cycle.

Now, the operations of the masters A 131, B 132, and C 133 and the priority level of the limited master changed by arbitrator 135 when the counter 172 is operating as a free-running counter will be described.

Figure 9:
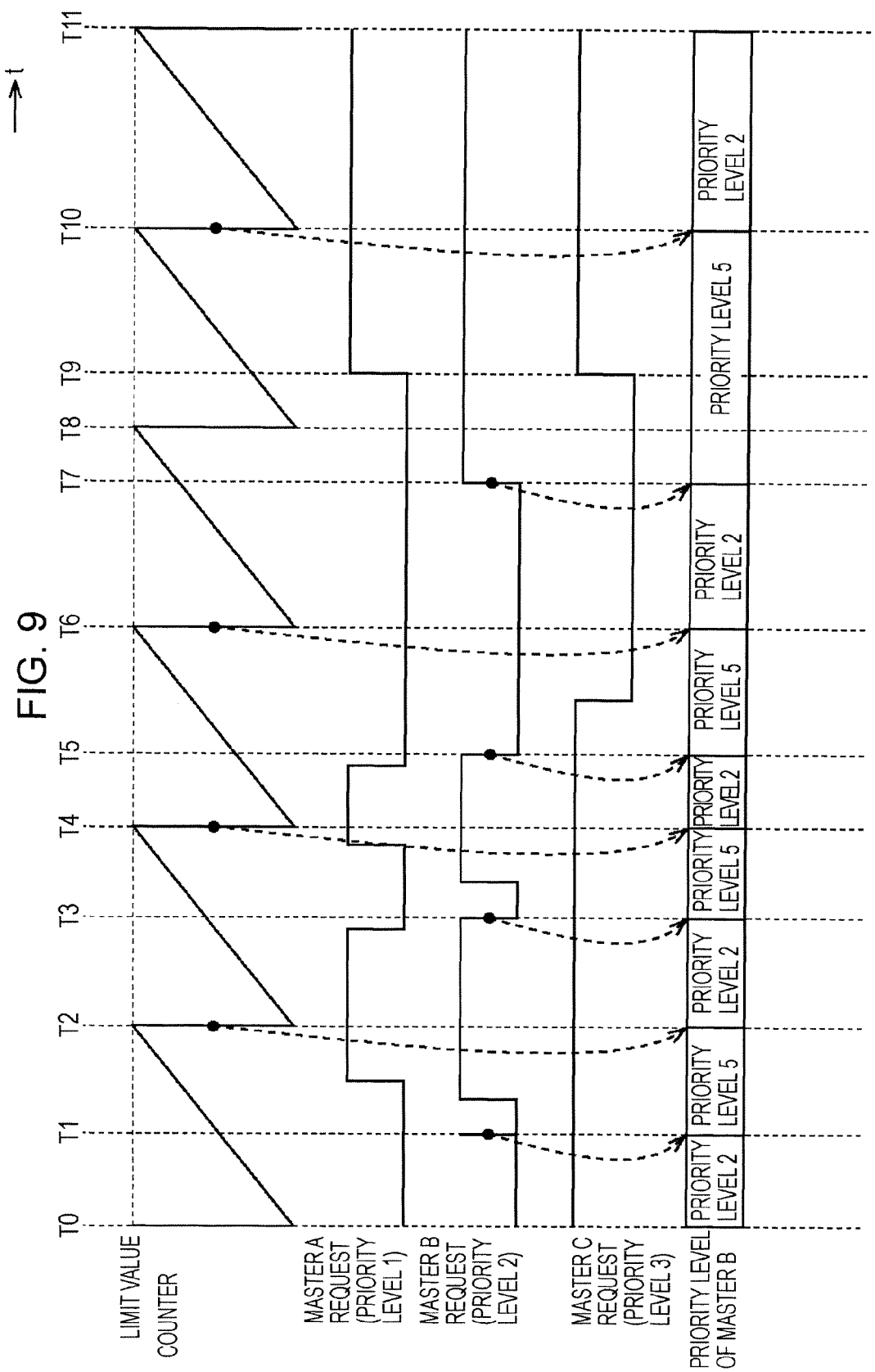
FIG. 9 is a timing chart illustrating access requests and priority levels of masters.

FIG. 9 is a timing chart illustrating the operation of the masters A 131, B 132, and C 133 when the counter 172 is free-running. In FIG. 9, the master B 132 is the limited master.

FIG. 9 illustrates, from top to bottom, a counter value of the counter 172, a request of the master A 131, a request of the master B 132, a request of the master C 133. In the upper area of FIG. 9, timings T0 to T11 are shown. In the lower area of FIG. 9, the priority level of the master B 132, which is the limited master, set by the arbitrator 135 is shown. The counter control unit 154 operates the counter 172 as a free-running counter having a cycle of $T_m$ to $T_{m+2}$ (where m represents a positive integer).

At the timing T0, the counter control unit 154 starts operating the counter 172. Access requests are not sent from the master A 131 and the master B 132, but an access request is sent from the master C 133. At this time, the priority level of the master B 132 is priority level 2.

At the timing T1, an access request is sent from the master B 132, and simultaneously, an access request is sent from the master C 133. In this case, access is permitted for the master B 132 having a higher priority level. After access is permitted for the master B 132, which is the limited master, the changing unit 171 of the priority control unit 152 lowers the priority level of the master B 132 at the arbitrator 135 to priority level 5.

At the timing T2, when the counter value of the counter 172 reaches a limit value, the changing unit 171 changes back the priority level of the master B 132 at the arbitrator 135 to priority level 2. At this time, the counter value of the counter 172 is reset, and the counter 172 starts counting up again.

In this way, by lowering the priority level of the master B 132 to priority level 5 between the timings T1 and T2, even when an access request is sent from the master B 132, access is permitted for the master C 133 of priority level 3 although its priority level is lower than the original priority level of the master B 132, i.e., priority level 2, because the priority level of the master C 133 is higher than priority level 5, i.e., the newly set priority level of the master B 132.

Between the timings T2 and T3, although access requests are simultaneously sent from the masters A 131, B 132, and C 133, access is permitted for only the master A 131 of priority level 1.

Throughout a period before and after the timing T3, an access request is sent constantly from the master C 133. Before the timing T3, the access requests from the master A 131 and the master B 132 trail. Therefore, access is permitted for the master B 132 of priority level 2 having a priority level higher than that of the master C 133 of priority level 3. When access is permitted for the master B 132, the changing unit 171 lowers the priority level of the master B 132 to priority level 5 at the arbitrator 135.

At the timing T4, when the counter value of the counter 172 reaches the limit value, the changing unit 171 changes back the priority level of the master B 132 at the arbitrator 135 to priority level 2. At this time, the counter control unit 154 continues to operate the counter 172 and resets the counter value of the counter 172 so that the counter 172 starts counting up again.

Since the priority level of the master B 132 is lowered to priority level 5 between the timings T3 and T4, even when an access request is sent from the master B 132, access is permitted for the master C 133 of priority level 3 unless an access request is sent from the master A 131 because the priority level of the master C 133 is lower than the original priority level of the master B 132, i.e., priority level 2, and higher than priority level 5 of the master B 132, i.e., the newly set priority level of the master B 132.

Between the timings T4 and T5, access requests are simultaneously sent from the masters A 131, B 132, and C 133. However, only access is permitted for the master A 131 of priority level 1.

Throughout a period before and after the timing T5, an access request is constantly sent from the master C 133. Before the timing T5, the access requests from the master A 131 and the master B 132 trail. Therefore, access is permitted for the master B 132 of priority level 2 having a priority level higher than that of the master C 133 of priority level 3. When access is permitted for the master B 132, the changing unit 171 lowers the priority level of the master B 132 to priority level 5 at the arbitrator 135.

At the timing T6, when the counter value of the counter 172 reaches the limit value, the changing unit 171 changes back the priority level of the master B 132 to priority level 2 at the arbitrator 135. At this time, the counter control unit 154 resets the counter value of the counter 172 so that the counter 172 starts counting up again.

Between the timings T5 and T6, the priority level of the master B 132 is lowered to priority level 5.

Between the timings T6 and T7, access requests are not sent from the masters A 131, B 132, and C 133. Between the timings T6 and T7, the priority level of the master B 132 is set to priority level 2.

At the timing 7, since an access request sent only from the master B 132, access is permitted for the master B 132. When access is permitted for the master B 132, the changing unit 171 lowers the priority level of the master B 132 to priority level 5 at the arbitrator 135. Between the timings T7 and T8, access requests are not sent from the master A 131 or the master C 133. Therefore, even when the priority level of the master B 132 is priority level 5, access is permitted for the master B 132.

At the timing T8, when the counter value of the counter 172 reaches the limit value, the changing unit 171 changes back the priority level of the master B 132 to priority level 2 at the arbitrator 135. Since an access request is sent only from the master B 132, access is permitted for the master B 132, and the changing unit 171 immediately lowers the priority level of the master B 132 to priority level at the arbitrator 135 5. In other words, at the timing T8, the priority level of the master B 132 is changed back to priority level 2 for an amount of time corresponding to one clock pulse but is soon lowered again to priority level 5. At this time, the counter value of the counter 172 is reset, and the changing unit 171 starts counting up again. Between the timings T8 and T9, similar to the case between the timings T7 and T8, since access requests are not sent from the masters A 131 and C 133, even when the priority level of the master B 132 is priority level 5, access is permitted for the master B 132.

At the timing T9, access requests are sent from the masters A 131, B 132, and C 133. At the timing T9, access is permitted for the master A 131 of priority level 1 having the highest priority level among the master A 131 of priority level 1, the master B 132 of the priority level 5, and the master C 133 of priority level 3.

At the timing T10, when the counter value of the counter 172 reaches the limit value, the changing unit 171 changes back the priority level of the master B 132 to priority level 2 at the arbitrator 135. At this time, the counter value of the counter 172 is reset, and the counter 172 starts counting up again.

Between the timings T10 and T11, access requests are simultaneously sent from the masters A 131, B 132, and C 133. However, access is permitted for the master A 131 of priority level 1. In other words, since access is not permitted for the master B 132, the priority level of the master B 132 is priority level 2 and unchanged.

At the timing T11, when the counter value of the counter 172 reaches the limit value, the counter control unit 154 resets the counter value of the counter 172.

In this way, when access is permitted for the limited master, the arbitrator 135 lowers the priority level of the limited master and then changes back the priority level of the limited master to the original priority level at least once in a predetermined cycle. In this way, access can be appropriately permitted for masters having priority levels lower than that of the limited master.

For example, to carry out image processing on a moving image in frames or fields of the digital video camera 51 employing unified memory architecture, when image data corresponding to a frame or a field is read out or written in during the frame time or the field time, access is permitted for masters during the frame time or the field time. Then, the priority levels of the masters are changed so that at least processing of one frame is completed within the frame time or at least processing of one field is completed within the field time, and the period of time for changing the priority levels is controlled. In this way, access to the memory 81 can be averaged.

For example, to maintain the frame rate or field rate, the limit value of the counter value is set on the basis of the minimum amount of time required for processing and the number of times the bus 61 needs to be accessed.

FIG. 10 is a flow chart illustrating another process of controlling the operation of the counter 172 at each clock pulse by the arbitrator 135.

In Step S51, the counter control unit 154 determines whether or not an access request is sent from a limited master on the basis of a signal from the priority control unit 152. In other words, the counter control unit 154 determines whether or not the access-request receiving unit 151 has received an access request from the limited master. In Step S51, if it is determined that an access request is sent from the limited master, the process goes to Step S52.

In Step S52, the counter control unit 154 determines whether or not the priority level of the limited master has been lowered on the basis of the signal representing the priority level of the limited master sent from the priority control unit 152. In Step S52, if it is determined that the priority level of the limited master has been lowered, the process goes to Step S53.

In Step S53, the counter control unit 154 operates the counter 172. Then, the process is completed. If the counter 172 is already operated, the counter control unit 154 continues to operate the counter 172. If the counter 172 is not operated, the counter control unit 154 starts operating the counter 172.

In Step S51, if it is determined that an access request is not sent from the limited master, or in Step S52, if is determined that the priority level of the limited master has not been lower, i.e., if is determined that the priority level of the limited master is the original priority level, the process goes to Step S54.

In Step S54, the counter control unit 154 resets the counter value of the counter 172. Then, the process is completed.

In this way, the counter control unit 154 operates the counter 172 only when an access request is sent from the limited master and when the priority level of the limited master is lowered and continues operating the counter 172.

The access operations of the masters A 131, B 132, and C 133 and the changing of priority level of the limited master by the arbitrator 135 when the counter 172 only operates when the counter 172 operates only while the priority level of the limited master is lowered and while an access request is being received from the limited master will be described below.

In the description below, the process starts with the priority level of the limited master being set lower than the original priority level.

Figure 11:
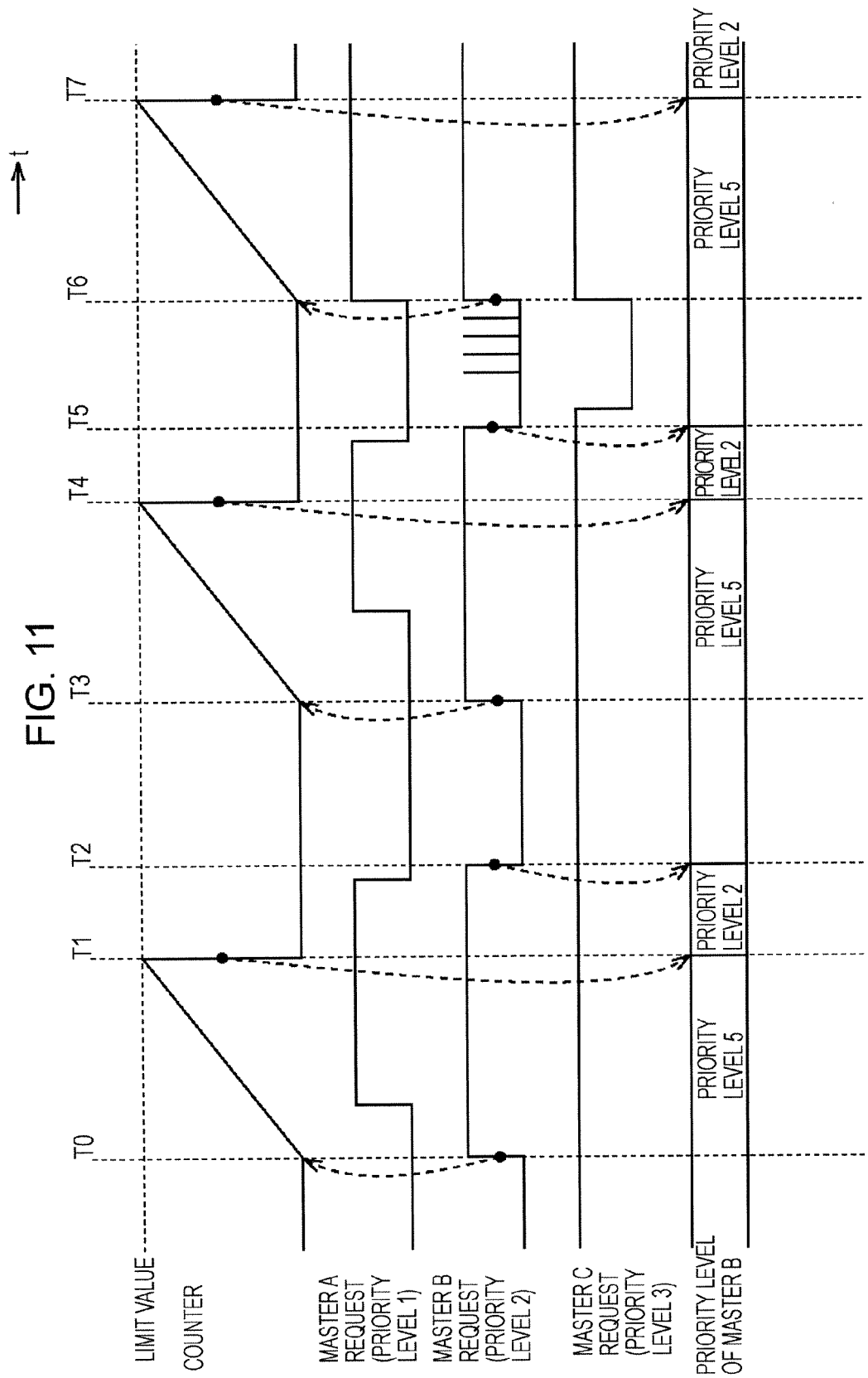
FIG. 11 is a timing chart illustrating access requests and priority levels of masters.

FIG. 11 is a timing chart illustrating the operations of the masters A 131, B 132, and C 133 when the counter 172 is operated only when the priority level of the limited master is lowered and when the limited master is sending an access request. In FIG. 11, similar to FIG. 9, the master B 132 is the limited master.

The timing chart in FIG. 11 illustrates a counter value of the counter 172, an access request from the master A 131, an access request from the master B 132, and an access request from the master C 133. In the upper area of FIG. 11, timings T0 to T7 are shown. In the lower area of FIG. 11, the priority level of the master B 132, which is the limited master, changed by the arbitrator 135 at each timing is shown.

An access request is continuously sent from the master A 131 during a period from a moment between the timings T0 and T1 to a moment immediately before the timing T1, a period from a moment between the timings T3 and T4 to a moment immediately before the timing T5, and a period starting from the timing T6.

An access request is continuously sent from the master B 132 during a period between the timings T0 and T2, a period between the timings T3 and T5, and a period starting from the timing T6. An access request is sent from the master B 132 four times during a period corresponding to a clock pulse in the period between the timings T5 and T6.

An access request is continuously sent from the master C 133 during a period from a moment between the timings T0 and T5 to the timing T6 and a period starting from the timing T6.

During the period between timings T0 and T1, an access request is continuously sent from the either the master A 131 of priority level 1 or the master C 133 of priority level 3, which both have priority levels higher than that of the master B 132 of priority level 5. Therefore, access is permitted for either the master A 131 or the master C 133.

The process starts with the priority level of the master B 132 set to priority level 5. At the timing T0, an access request starts to be sent from the master B 132. When the access request continues to be sent from the master B 132, during the period between the timings T0 and T2, the priority level of the master B 132, which is the limited master, is lowered, and the counter 172 operates only while an access request is being sent from the limited master. Therefore, the counter 172 counts up when the priority level of the master B 132, which is the limited master, is lowered in the period between the timings T0 and T2.

At the timing T1, the limit value reaches the counter value of the counter 172. Therefore, at the timing T1, the changing unit 171 of the priority control unit 152 changes back the priority level of the master B 132 to the original priority level. The priority level of the master B 132 is set to priority level 2. Since the priority level of the master B 132 is returned to the original priority level, the counter control unit 154 resets the counter value of the counter 172.

At the timing T1, an access request is sent from the master A 131 of priority level 1 having a priority level higher than that of the master B 132 of priority level 2. Accordingly, access is permitted for the master A 131.

At the timing T2, an access request is no longer sent from the master A 131, but an access request is sent from the masters B 132 and C 133. Accordingly, access is permitted for the master B 132 of priority level 2 having a priority level higher than that of the master C 133 of priority level 3.

At the timing T2, when access is permitted for the master B 132, the changing unit 171 of the priority control unit 152 lowers the priority level of the master B 132 to priority level 5.

In this way, during the period between the timings T1 and T2, the priority level of the master B 132 is set to priority level 2.

Since, during the period between the timings T1 and T2, the priority level of the master B 132 is changed back to the original priority level, the counter control unit 154 resets the counter value of the counter 172 at each clock pulse. Therefore, during the period between the timings T1 and T2, the counter 172 does not count up.

Since, during the period from the timing T2 to the timing T3, the master B 132 does not send an access request, the counter 172 does not count up during the period from the timing T2 to the timing T3.

Since the counter 172 does not count up during the period between the timings T2 and T3, the counter value does not reach the limit value, and the priority level of the master B 132 is set to priority level 5.

During the period between the timings T3 and T4, an access request is continuously sent from the master A 131 of priority level 1 or from the master C 133 of priority level 3, each having priority levels higher than that of the master B 132 of priority level 5. Therefore, access is permitted for either the master A 131 or the master C 133.

When the priority level of the master B 132 is set to priority level 5, an access request from the master B 132 starts to be sent at the timing T3, and an access request from the master B 132 continues to be sent during the period between timings T3 and T5, the priority level of the master B 132, which is the limited master, is lowered and the counter 172 operates only while an access request is sent from the limited master. Therefore, the counter 172 counts up during a period of the priority level of the master B 132, which is the limited master, is being lowered within the period from the timing T3 to the timing T5.

Since, at the timing T4, the counter value of the counter 172 reaches the limit value, the changing unit 171 of the priority control unit 152 changes back the priority level of the master B 132 to the original priority level. Since the priority level of the master B 132 is returned to the original priority level, the counter control unit 154 resets the counter value of the counter 172.

Since, at the timing T4, an access request is sent from the master A 131 of priority level 1 having a priority level higher than that of the master B 132 of priority level 2, access is permitted for the master A 131.

At the timing T5, the master A 131 stops sending an access request, but the master B 132 and the master C 133 send access requests. Therefore, access is first permitted for the master B 132 of priority level 2 having a priority level higher than that of the master C 133 of priority level 3.

When, at the timing T5, access is permitted for the master B 132, the changing unit 171 of the priority control unit 152 lowers the priority level of the master B 132 to priority level 5.

In this way, during the period between the timings T4 and T5, the priority level of the master B 132 is set to priority level 2.

Since, during the period between the timings T4 and T5, the priority level of the master B 132 is changed back to the original priority level, the counter control unit 154 resets the counter value of the counter 172 at each clock pulse. Therefore, the counter 172 does not count up during the period between the timings T4 and T5.

During the period between the timings T4 and T5, the master B 132 sends access requests four times during a period of time corresponding to one clock pulse. However, since the counter control unit 154 resets the counter value of the counter 172 when the master B 132 stops sending an access request, the counter value of the counter 172 set when the counter 172 was reset is stored.

Since, during the period between the timings T5 and T6, the counter 172 does not count up, the counter value does not reach the limit value, and the priority level of the master B 132 is set to priority level 5.

Since, during the period between the timings T6 and T7, access requests are continuously sent from the master A 131 of priority level 1 and the master C 133 of priority level 3 each having a priority level higher than that of the master B 132 of priority level 5, access is permitted from the master A 131.

When the priority level of the master B 132 is set to priority level 5, an access request from the master B 132 starts to be sent at the timing T6, and the access request continues to be sent from the master B 132 during the period between the timings T6 and T7, the priority level of the master B 132, which is the limited master, is lowered and the counter 172 is operated only while an access request is sent from the limited master. Therefore, the counter 172 counts up during a period when the priority level of the master B 132, which is the limited master, is lowered in the period between the timings T6 and T7.

Since, at the timing T7, the counter value of the counter 172 reaches the limit value, the changing unit 171 of the priority control unit 152 changes back the priority level of the master B 132 to the original priority level. The priority level of the master B 132 is set to priority level 2. Since the priority level of the master B 132 is returned to the original priority level, the counter control unit 154 resets the counter value of the counter 172.

Since, at the timing T7, an access request is sent from the master A 131 of priority level 1, which has a priority level higher than that of the master B 132 of priority level 2, access is permitted for the master A 131.

In this way, the arbitrator 135 can permit access of the limited master after a predetermined delay time from the moment an access request is sent from the limited master to the moment the counter value reaches the limit value.

In this way, operation can be carried out with a predetermined latency, and access can be less concentrated.

In this way, by connecting masters that operate on different cycles due to real time processing and best-effort processing to a common bus, efficient access of masters operating according to best-effort processing is possible while maintain real-time processing of other masters. Thus, the access efficiency to the bus 61 is improved, and the usage rate is increased. In particular, for mobile devices that are required to efficiently use limited resources, processing can be sufficiently supported by the arbitrator, regardless of the structure of the masters. Thus, the structure of the mobile device can be simplified and the size can be reduced.

In the descriptions above, values such as the counter value are controllable by software, and depending on the system requirements, control can be changed arbitrarily.

In the descriptions above, access of one master is limited. Instead, however, access of all masters may be limited. Furthermore, to limit access, the original priority level is lowered. Instead, however, the original priority level may be raised.

As described above, when communication between a plurality of devices is controlled via a common channel on the basis of predetermined priority levels of the devices, the devices can access the memory. Furthermore, when the priority level, i.e., a first priority level, of a predetermined device of a plurality of devices is changed to a second priority level for a predetermined amount of time and when the predetermined amount of time is controlled, the devices can periodically and efficiently access the memory.

The above-described series of processing can be executed by hardware or software. When the series of processing is executed by software, the programs constituting the software is installed from a program recording medium to a computer installed in special hardware or a general-purpose computer that is capable of executing various functions by installing various programs.

The program recording medium, shown in FIG. 3, storing programs to be installed in a computer and executed by the computer is constituted of magnetic disks (including flexible disk), optical disks (including compact disc-read only memories (CD-ROM) and digital versatile discs (DVD)), magneto-optical disks, the removable medium 83 that is a package medium constituted of a semiconductor memory, a ROM (not shown) that temporarily or permanently stores the programs, and hard disks constituting the recording unit 78. To store the programs on a program recording medium, a local area network, the Internet, digital satellite broadcasting, wire and wireless communication medium are used, when necessary, via a communication unit (not shown) that is an interface, such as a router or a modem.

The steps of writing the program in the program recording medium, described above, may be carried out time-sequentially in the order described or, instead, may not be carried out time-sequentially and may be carried out in parallel or individually.

The embodiments of the present invention are not limited to the above-described embodiments, and various modifications may be included in the scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus configured to control communications of a plurality of devices via a common communication channel including a bus on the basis of a predetermined priority level of each of the devices and successive clock pulses, the apparatus comprising:

changing means for changing the priority level of a predetermined device from a first priority level to a second priority level for a predetermined amount of time in response to a communication request from the predetermined device, the predetermined device being one of the plurality of devices, wherein a priority level of another device of the plurality of devices is unchanged when the priority level of the predetermined device is changed; and controlling means for controlling the length of the predetermined amount of time by operating a counter to count up, from an initial value, at each successive clock pulse, starting when the priority level of the predetermined device is changed to the second priority level in response to the communication request, and to reset a counted number of clock pulses to the initial value when the counted number of clock pulses reaches a predetermined threshold value, the plurality of devices transmitting and receiving image data between each other via the communication channel, the image data configured by frames or fields, the changing means changing the priority level of the predetermined device during the predetermined amount of time so that image processing, of at least a frame or a field, is completed within a predetermined amount of frame time assigned to a frame or a predetermined amount of field time assigned to a field, and the controlling means controlling the length of the predetermined amount of time so that the length of the frame time or the field time is maintained within the length of the predetermined amount of time and a minimum frame rate or a minimum field rate is maintained.

2. The information processing apparatus according to claim 1, wherein the changing means returns the second priority level of the predetermined device to the first priority level after the predetermined amount of time elapses.

3. The information processing apparatus according to claim 1,
wherein the changing means returns the priority level of the predetermined device having the second priority level to the first priority level when the counted number of clock pulses reaches the predetermined threshold value.

4. The information processing apparatus according to claim 1, wherein the first priority level is a higher priority level than the second priority level.

5. The information processing apparatus according to claim 1, wherein the counter counts up only when the priority level of the predetermined device is changed to the second priority level and the predetermined device requests communication access.

6. A method of processing information for controlling communications of a plurality of devices via a common communication channel including a bus on the basis of a predetermined priority level of each of the devices and successive clock pulses, the method comprising:
changing the priority level of a predetermined device from a first priority level to a second priority level for a predetermined amount of time in response to a communication request from the predetermined device, the predetermined device being one of the plurality of devices, wherein a priority level of another device of the plurality of devices is unchanged when the priority level of the predetermined device is changed;
controlling the length of the predetermined amount of time by operating a counter to count up, from an initial value, at each successive clock pulse, starting when the priority level of the predetermined device is changed to the second priority level in response to the communication request, and to reset a counted number of clock pulses to the initial value when the counted number of clock pulses reaches a predetermined threshold value;
transmitting and receiving image data between the plurality of devices via the communication channel, the image data configured by frames or fields;
changing the priority level of the predetermined device during the predetermined amount of time so that image processing, of at least a frame or a field, is completed within a predetermined amount of frame time assigned to a frame or a predetermined amount of field time assigned to a field; and
controlling the length of the predetermined amount of time so that the length of the frame time or the field time is maintained within the length of the predetermined amount of time and a minimum frame rate or a minimum field rate is maintained.

7. A computer readable medium for controlling communications of a plurality of devices via a common communication channel including a bus on the basis of a predetermined priority level of each of the devices and successive clock pulses, the computer readable medium including computer executable instructions, wherein the instructions, when executed by a processor, cause the processor to perform a method comprising:
changing the priority level of a predetermined device from a first priority level to a second priority level for a predetermined amount of time in response to a communication request from the predetermined device, the predetermined device being one of the plurality of devices, wherein a priority level of another device of the plurality of devices is unchanged when the priority level of the predetermined device is changed;
controlling the length of the predetermined amount of time by operating a counter to count up, from an initial value, at each successive clock pulse, starting when the priority level of the predetermined device is changed to the second priority level in response to the communication request, and to reset a counted number of clock pulses to the initial value when the counted number of clock pulses reaches a predetermined threshold value;
transmitting and receiving image data between the plurality of devices via the communication channel, the image data configured by frames or fields;
changing the priority level of the predetermined device during the predetermined amount of time so that image processing, of at least a frame or a field, is completed within a predetermined amount of frame time assigned to a frame or a predetermined amount of field time assigned to a field; and
controlling the length of the predetermined amount of time so that the length of the frame time or the field time is maintained within the length of the predetermined amount of time and a minimum frame rate or a minimum field rate is maintained.

8. An information processing apparatus configured to control communications of a plurality of devices via a common communication channel including a bus on the basis of a predetermined priority level of each of the devices and successive clock pulses, the apparatus comprising:
a changing unit configured to change the priority level of a predetermined device from a first priority level to a second priority level for a predetermined amount of time in response to a communication request from the predetermined device, the predetermined device being one of the plurality of devices, wherein a priority level of another device of the plurality of devices in unchanged when the priority level of the predetermined device is changed;

a controlling unit configured to control the length of the predetermined amount of time by operating a counter to count up, from an initial value, at each successive clock pulse, starting when the priority level of the predetermined device is changed to the second priority level in response to the communication request, and to reset a counted number of clock pulses to the initial value when the counted number of clock pulses reaches a predetermined threshold value;

transmitting and receiving image data between the plurality of devices via the communication channel, the image data configured by frames or fields;

changing the priority level of the predetermined device during the predetermined amount of time so that image processing, of at least a frame or a field, is completed within a predetermined amount of frame time assigned to a frame or a predetermined amount of field time assigned to a field; and controlling the length of the predetermined amount of time so that the length of the frame time or the field time is maintained within the length of the predetermined amount of time and a minimum frame rate or a minimum field rate is maintained.

* * * * *